Jan. 2, 1951 — L. A. SMITH — 2,536,102
PHASE RELATIONSHIP ADJUSTER
Filed Jan. 2, 1947 — 2 Sheets-Sheet 1

INVENTOR.
LEONARD A. SMITH
BY Wade Koontz AND
Frederick W. Cotterman
ATTORNEYS

Jan. 2, 1951 L. A. SMITH 2,536,102
PHASE RELATIONSHIP ADJUSTER
Filed Jan. 2, 1947 2 Sheets-Sheet 2

INVENTOR.
LEONARD A. SMITH
BY Wade Koontz AND
Frederick W. Cotterman
ATTORNEYS

Patented Jan. 2, 1951

2,536,102

UNITED STATES PATENT OFFICE 2,536,102

PHASE RELATIONSHIP ADJUSTER

Leonard A. Smith, Montgomery, W. Va.

Application January 2, 1947, Serial No. 719,645

3 Claims. (Cl. 74—395)

(Granted under the act of March 3, 1883, as amended April 30, 1928; 370 O. G. 757)

The invention described herein may be manufactured and used by or for the Government for governmental purposes without payment to me of any royalty thereon.

This invention relates to phase adjusting mechanism and has particular reference to a device for adjusting the phase relationship for two rotating devices which are being driven by the same rotating power means.

An object of the invention is to provide a device of this character which is extremely simple in construction and inexpensive to build, yet capable of adjusting the phase relation of the two elements with extreme accuracy.

Other objects and advantages will become evident as the invention is further described, reference being had to the drawing, wherein, Fig. 1 is a plan view of an embodiment of my invention.

Like reference characters refer to like parts throughout the several views.

Figure 1:
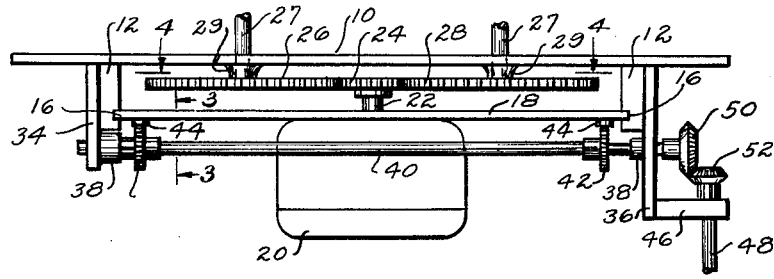
Figure 2:
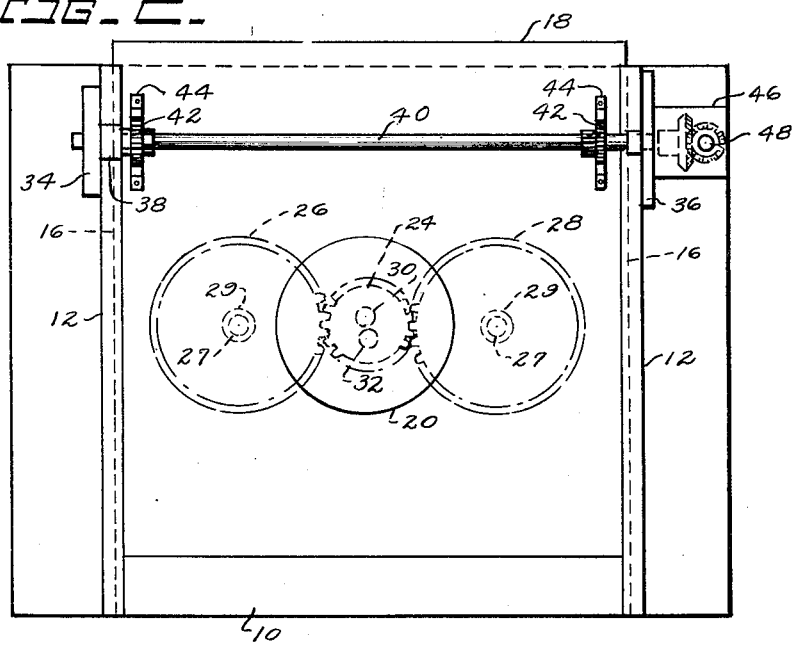
Fig. 2 is an elevation of the device shown in Fig. 1.
Figure 3:
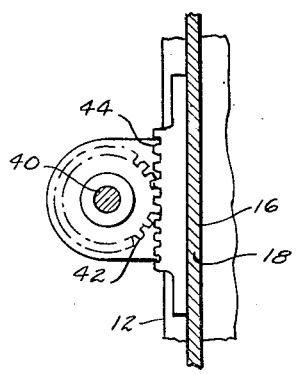
Fig. 3 is an enlarged fragmentary section taken at 3—3 of Fig. 1.

The embodiment of the invention herein shown and described, while it may be adapted to a variety of uses, is particularly applicable to a device which includes two split stator capacitors driven by one motor, the capacitors having the same gear ratio, being geared to the motor pinion. For effective operation of the device, these capacitors, one controlling the frequency and the other controlling the sweep voltage, must have a phase relationship of ninety degrees one from the other, i. e., one capacitor being at minimum when the other is at maximum capacity.

An initial coarse adjustment of the angular displacement of the capacitor rotors can be made by a proper selection of the teeth on the capacitor gears which are to be engaged by the teeth on opposite sides of the motor pinion. This adjustment will provide a phase relation between the capacitor rotors which will be not more than 180/N degrees from the most effective angle, N being the number of teeth in one of the capacitor gears which are meshed with the motor pinion.

It was observed, however, that the angular displacement of the capacities relative to each other varied with the rotational speed of the capacitors which made it advisable to provide some means of fine adjustment whereby the capacities, rather than the capacitor rotors, could be observed and brought into exact phase relationship while the device was in operation. The embodiment of the invention devised to accomplish this end will now be described.

Referring particularly to the exemplification of the invention shown in Figs. 1 through 4, a frame plate 10 has secured thereto two guide bars 12, each grooved at 16 for slidably receiving a motor mounting plate 18.

Plate 18 has a motor 20 fastened thereon, the shaft 22 of the motor extending through the plate 18 and carrying a pinion 24 at its outer end. Gears 26 and 28 are fast on shafts 27 which are rotatable in bearings 29 in the frame plate 10 and are in permanent mesh with the pinion 24. The axes of the pinion 24 and gears 26, 28 are normally in the same plane, but by moving the motor plate 18 in the grooves 16, the motor axis may be moved out of this plane as at 30 or 32, Fig. 2.

For moving the motor mounting plate 18 in the grooves 16, brackets 34 and 36 are attached to the guide bars 12 or to any stationary member such as the frame plate 10. Brackets 34 and 36 have hubs 38 which provide rotative bearing for a control shaft 40 upon which the control pinions 42 are secured. Short racks 44 are secured to the motor plate 18 so as to be in constant mesh with the pinions 42, whereby rotation of the shaft 40 moves the motor mounting plate 18 and the axis of motor 20 into or out of the plane of the axes of the gears 26, 28.

Bracket 36 has an extension 46 which provides rotative bearing for a control shaft 48. Bevel gears 50 and 52 fast on shafts 40 and 48 respectively are in constant mesh one with the other, whereby rotation of the control shaft 48 rotates the shaft 40 and pinions 42 which moves the racks 44 to move the motor mounting plate 18 in the grooves 16.

Figure 4:
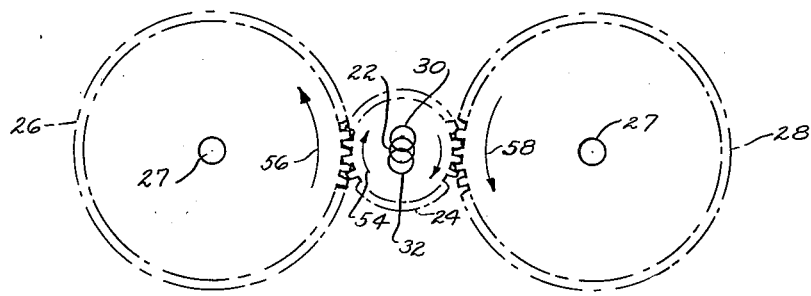
Fig. 4 is a view of the gearing of the device taken at 4—4 of Fig. 1.

The operation of the embodiment of the invention as illustrated in Figs. 1 through 4 is as follows:

With particular reference to Fig. 4, assume that the motor pinion 24 rotates clockwise as shown by the arrows 54 whereby the capacitor gears 26 and 28 will rotate anticlockwise as shown by arrows 56 and 58.

If the motor pinion 24 is now moved so that its shaft 22 occupies the position 30 (see Fig. 4), the gear 26 will have been advanced about one tooth in the direction of its rotation and the gear 28 will have been retarded about one tooth in the direction of its rotation. Obviously, if the pinion 24 is moved so that its shaft 22 occupies the position 32, the gear 28 will have been advanced and the gear 26 retarded. It is noted that movement of the motor shaft 22 to the position 30 or 32, increases the gear centers by only slightly more than .001" while changing the phase relationship an angular distance equal to two teeth. This increase in center distance is no objection where involute gears are employed.

Figure 5:
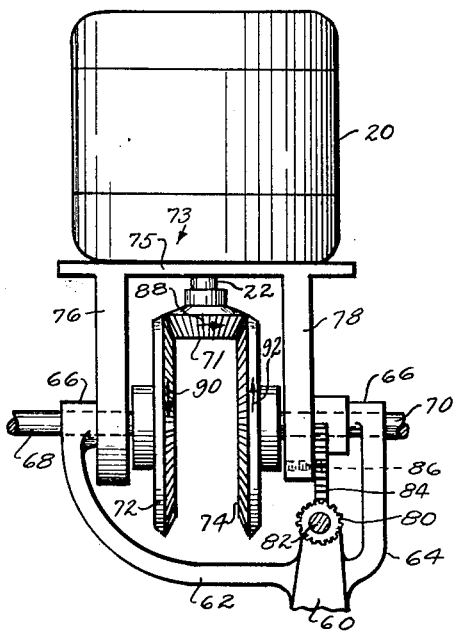
Fig. 5 shows a modification of the device in front elevation.
Figure 6:
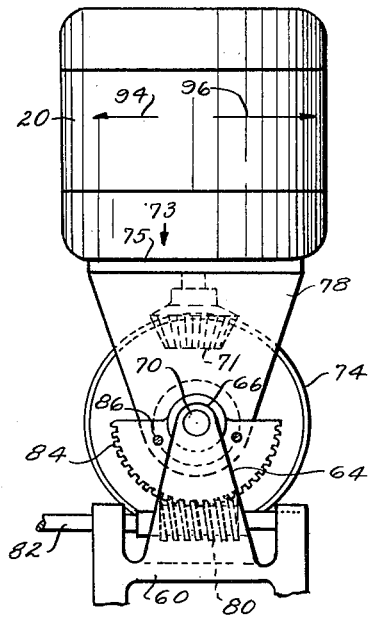
Fig. 6 shows the device of Fig. 5 in side elevation.

In the modification shown in Figs. 5 and 6, a stationary frame 60 has two arms 62 and 64 extending therefrom. Hubs 66 on the arms 62 and 64 provide bearings for the shafts 68 and 70 which, at their inner ends, carry the bevel gears 72 and 74, respectively, which are in constant mesh with a bevel pinion 71 on the shaft 22 of the motor. The rotors of the split stator capacitors or other devices which are to be brought into exact phase relation are secured, one to each of the shafts 68 and 70.

A motor cradle 73 has a platen 75 to which the motor 20 is secured, and two brackets 76 and 78 having bearing on the shafts 68 and 70, respectively. A worm 80 is carried on a control shaft 82 which has rotative bearing in the frame 60. A worm wheel segment 84 is fastened by screws 86 to the bracket 78 and is in constant mesh with the worm 80, whereby rotation of the control shaft 82 one or the other direction rocks the cradle 73 which carries the motor 20.

The operation of the embodiment shown in Figs. 5 and 6 is as follows:

Assume that the motor 20 is rotating clockwise viewed from the motor pinion end, i. e., in the direction of the arrow 88. The gear 72 will be rotating in the direction of the arrow 90, and the gear 74 will be rotating in the direction of the arrow 92. If, by means of the control shafts 82, the cradle 73 is rocked in the direction of the arrow 94, the gear 72 will be advanced in the direction of its rotation and the gear 74 will be retarded in the direction of its rotation.

On the other hand, if the cradle 72 is rocked in the direction of the arrow 96, the gear 72 will be retarded in the direction of its rotation and the gear 74 will be advanced. With this device, the rotors of two split stator capacitors may be brought into correct phase relationship through 180 degrees.

Having described several embodiments of the invention, I claim:

1. In a mechanism for adjusting the phase relationship between two axially parallel unidirectionally rotating elements, the combination of two gears adapted to be drivably connected one to each element, a motor rotor, a pinion on said rotor in mesh with said gears, the axes of said gears and pinion being normally in the same plane, and means to move the axis of said pinion in either direction out of said plane.

2. A device of the character described which comprises, in combination, a frame, guide means on said frame, a motor support slidable in said guide means, a motor carried on said support, a rotor for said motor, a pinion carried on said rotor, two gears in constant mesh with said pinion rotatably supported on said frame and adapted for drivable connection with unidirectionally rotating elements, the axes of said gears and said pinion being normally in the same plane, and adjusting means to move said motor support, thereby to move the axis of said motor in either direction out of the plane of the axes of said gears.

3. The mechanism of claim 2 wherein the adjusting means to move said motor support consists of racks fast on said motor support extending in the same direction as said guide means, control pinions meshed in said racks, a control shaft for carrying said control pinions extending transversely of the gear axes, bearings on said frame for said control shaft and means to rotate said control shaft.

LEONARD A. SMITH.

REFERENCES CITED

The following references are of record in the file of this patent:

UNITED STATES PATENTS

| Number | Name | Date |
|---|---|---|
| 323,725 | Pattison | Aug. 4, 1885 |
| 2,038,943 | La Fountain | Apr. 28, 1936 |
| 2,144,964 | De Falco | Jan. 24, 1939 |
| 2,235,179 | Tangen | Mar. 18, 1941 |
| 2,407,322 | Morrison | Sept. 10, 1946 |

FOREIGN PATENTS

| Number | Country | Date |
|---|---|---|
| 23,492 | Great Britain | Nov. 17, 1908 |